Aug. 5, 1941.                J. P. SAVAGE                 2,251,720
                        BRASS BEARING FOR JOURNALS
                          Filed Jan. 12, 1940           2 Sheets-Sheet 1
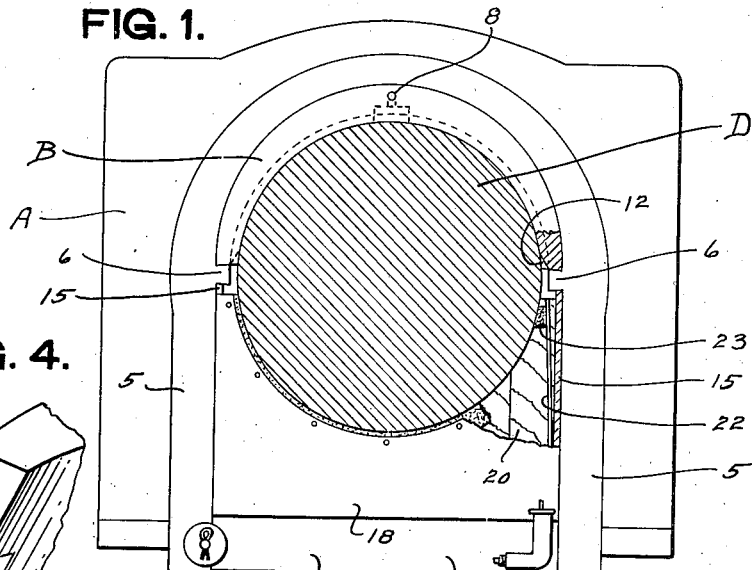
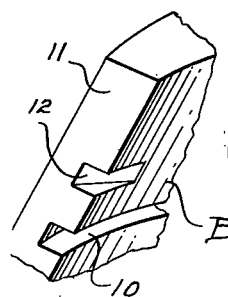
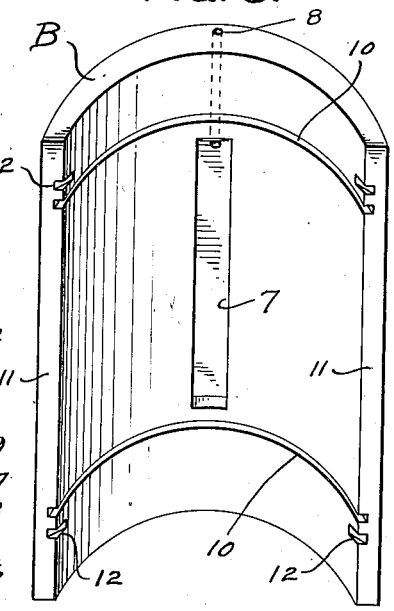
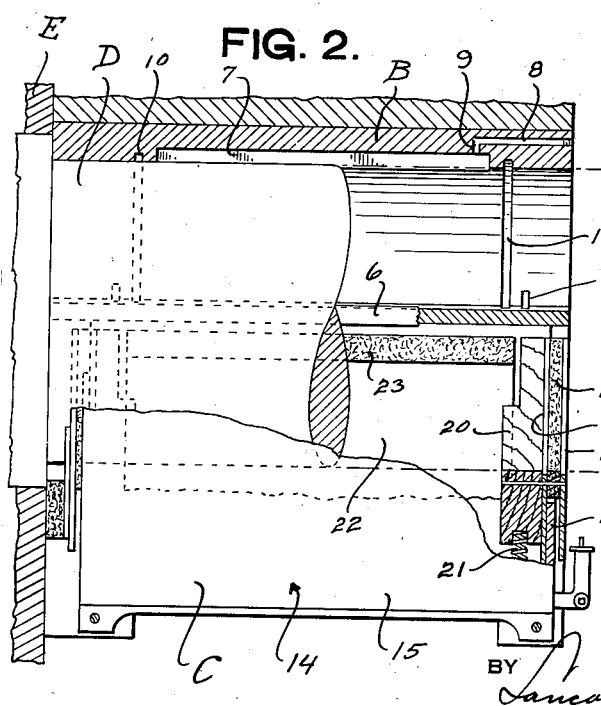
INVENTOR.
Joseph P. Savage
BY Lancaster Allwin Rommel
ATTORNEYS.

Aug. 5, 1941.  J. P. SAVAGE  2,251,720
BRASS BEARING FOR JOURNALS
Filed Jan. 12, 1940  2 Sheets-Sheet 2
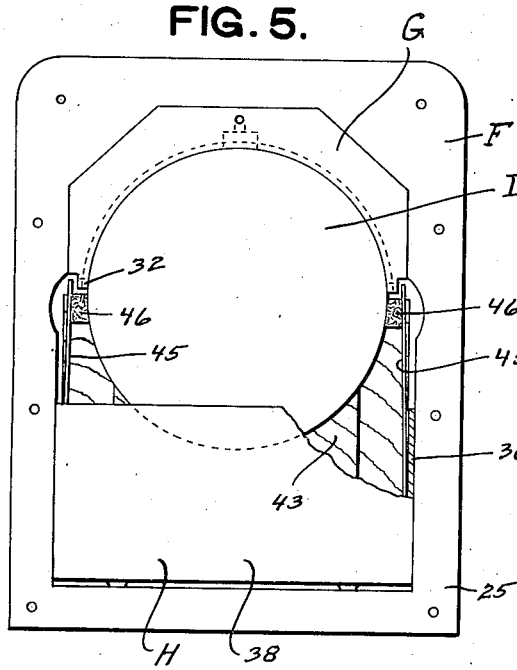
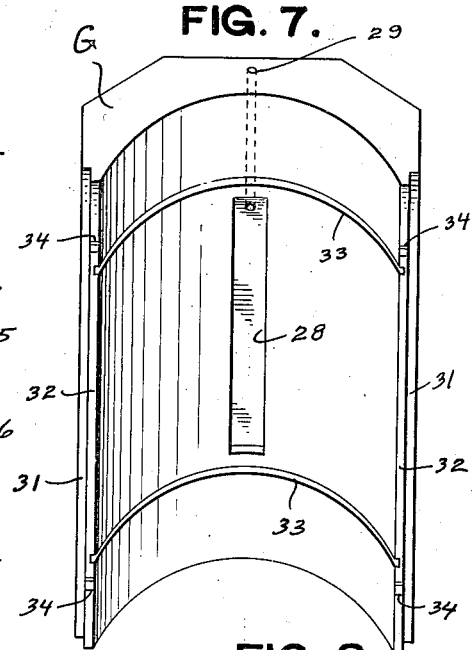
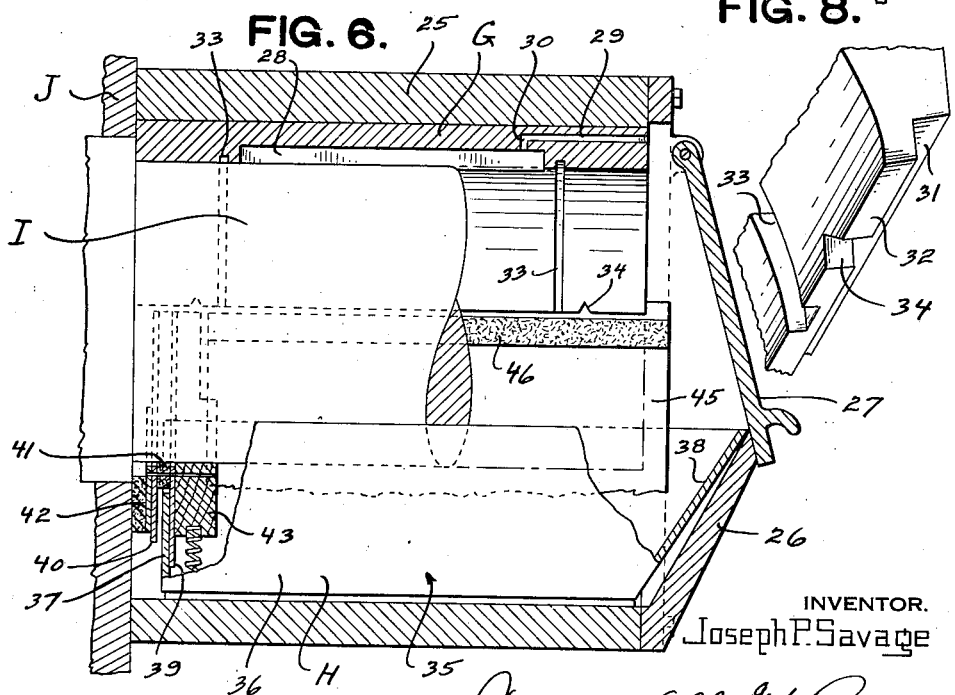
INVENTOR.
Joseph P. Savage
BY Lancaster, Allwine and Rommel
ATTORNEYS.

Patented Aug. 5, 1941

2,251,720

UNITED STATES PATENT OFFICE 2,251,720

BRASS BEARING FOR JOURNALS

Joseph P. Savage, Columbus, Nebr.

Application January 12, 1940, Serial No. 313,617

7 Claims. (Cl. 308—79.1)

The present invention relates to locomotive journal bearings and more particularly to crown brasses for use in connection with driving boxes, trailer and truck boxes of locomotive journals.

This application is a continuation in part of my copending application for patent for Locomotive journal oilers (filed February 4, 1938, Serial Number 188,771, now Patent Number 2,188,926.

A primary object of the present invention is to provide a locomotive journal bearing embodying improved means for efficient lubrication of the journal without waste or loss of the lubricant.

A further object of the invention resides in the provision of a journal box lubricator embodying means whereby excess oil is returned to a receptacle or cellar of the box.

A further object resides in the novel arrangement whereby the oil or lubricant is uniformly distributed thruout the length of the journal without loss of lubricant beyond the ends of the journal.

A further and important object of the invention is to provide a brass embodying means for preventing the lubricant from working or creeping to the ends of the brass and being lost or wasted.

A still further object resides in the provision of a crown brass having notches so arranged in its lower edges as to prevent loss of the lubricant beyond the ends of the brass.

A still further object resides in the arrangement for efficiently lubricating the end portions of the crown brass.

Other objects and advantages of the invention will be apparent from the following detailed description taken in connection with the accompanying drawings forming a part of this specification and in which drawings—

Figure 1 is a view looking at the inner end of a driving box provided with the improved crown brass and showing a portion of the oil cellar broken away, the driving axle journal being shown in section.

Figure 2 is a vertical longitudinal section thru the driving box with the oil cellar broken away and showing one of the oil retaining units in vertical section.

Figure 3 is a perspective view looking at the concaved side of the crown brass for driving boxes.

Figure 4 is an enlarged fragmentary perspective view of one end portion of the crown brass shown in Figure 3.

Figure 5 is a view showing a slightly modified form of the invention applied to a trailer box, the view being one looking at the outer end of the box and with the outer cover plate removed.

Figure 6 is a vertical longitudinal section thru the trailer box with a portion of the cellar in elevation.

Figure 7 is a perspective view looking at the concaved side of the crown brass for trailer boxes.

Figure 8 is an enlarged fragmentary perspective view of one end portion of the crown brass shown in Figure 7.

Referring to the drawings in detail and wherein like reference characters designate corresponding parts thruout the several views, in Figures 1 to 4, the letter A may designate a driving box provided with the crown brass B and lubricator means C. The letter D designates a driving axle journal having a driving wheel mounted upon its outer end as at E in Figure 2. In Figures 5 to 8, the letter F designates a trailer box provided with the crown brass G and lubricator means H. The letter I may designate a trailer axle journal having a wheel J mounted upon its inner end as shown in Figure 6.

Referring first to the form of the invention shown in Figures 1 to 4, the driving box A is of ordinary construction having the depending side arms 5 provided along their inner sides with horizontal dove-tailed supporting ribs 6 forming supports for the lower edges of the crown brass B. The brass B may be pressed or driven into tight fitting engagement in the box A and as shown in Figure 2, the ends of the brass are flush with the ends of the driving box.

Formed longitudinally in the top center of the concaved bearing surface of the brass B is an oil slot or recess 7 which terminates short of the ends of the brass as shown in Figures 2 and 3. Extending inward from one end of the brass above an end of the slot 7 is a bore 8 which communicates at its inner end with a lateral bore 9 extending into the bottom of the slot 7 whereby oil or other suitable lubricant may be delivered to the slot 7 by means of a force feed connection with the outer end of the bore 8. Provided in the concaved side of the brass slightly beyond each end of the slot 7 is a circumferential oil or end groove 10 having their ends opening at the bottom surface 11 of the brass. As shown by dotted lines in Figure 1, these grooves 10 are of such depth as to have the bottom surfaces of the grooves extend flush with the inner faces of the supporting ribs 6. It will also be seen from Figure 1 that the journal D is out of contact with the supporting ribs 6 thus forming outlets for the lower ends of the grooves 10. Provided in the lower inner corner edges of the brass B just outwardly beyond each lower end of the circumferential grooves 10, are check notches 12 of triangular-shape which serve to prevent the oil from working or creeping towards the ends of the brass and being lost or wasted. As will be seen, these check notches 12 extend for a short distance along the concaved bearing surface of the brass and gradually decrease in depth from the bottom surface 11. The lower deeper portions of the notches 12 are of a depth equal to the depth of the grooves 10.

Removably fitting between the arms 5 beneath the journal D is an oil container or cellar 14 having vertical side walls 15, the upper ends of which engage the under sides of the ribs 6, and end walls 16 having their upper edges of semi-circular shape for receiving the journal D. Telescopically associated with each end wall 16 is an oil retaining unit, each including an inner guide plate 17, an outer or dust plate 18, and a felt oil strip 19 secured between the upper edges of the plates 17 and 18 for contacting the journal D. Secured to the inner side of each plate 17 is a wooden block 20 having semi-circular shaped upper faces for engaging the journal. The oil retaining units are normally urged upwardly into contact with the journal by means of coil springs 21 acting upon the lower sides of the blocks 20. Arranged inward of each side wall 15 of the cellar 14 is a yieldable wiper plate 22 having a felt wiper strip 23 secured along its upper inner side for wiping contact with the journal. These wiper plates 22 are normally spring urged toward the journal at their upper portions, and have their end edges spaced slightly from the blocks 20 as shown in Figure 2. The end edges of the wiper plates 22 extend into rabbets formed in the vertical edges of the blocks 20.

As will be seen in Figure 2, the lower ends of the circumferential end grooves 10 terminate above the end portions of the wiper felts 23, while the check notches 12 are disposed above the end portions of the blocks 20 and inward of the felt oil strips 19. It will also be seen that the lower portions of the blocks 20 extend inward for a short distance beyond the ends of the wiper felts 23.

Any suitable form of oil feeding means may be arranged in the cellar 14 for feeding oil to the journal D and if so desired, a lubricating unit such as disclosed in my co-pending application referred to may be employed.

In operation, the longitudinal slot 7 serves to keep reserve oil directly above the center of the journal for positive lubrication, while the end grooves 10 serve to keep oil from working out to the ends of the brass and return this oil to the cellar 14. The oil collected in the end grooves 10 drains to the lower open ends of the grooves and any of this oil which works or creeps toward the ends of the brass is stopped by the check notches 12. Oil from the lower ends of the end grooves 10 drops mainly on the wiper felts 23, while some may drop on the blocks 20. Since the lower portions of the blocks 20 extend inwardly and lie in the circumferential plane of the ends of the wiper felts 23, sufficient oil is supplied to the blocks by the end portions of the wiper felts as to efficiently lubricate the end portions of the brass without loss or waste of the lubricant beyond the ends of the brass.

In actual tests, close observations disclosed that the blocks 20 receive enough oil to lubricate the end portions of the brass sufficiently and very satisfactorily, and without any signs of heating beyond the end grooves 10.

Referring now to the form of the invention as disclosed in Figures 5 to 8 inclusive, the crown brass G and cellar H have been shown of slightly modified construction for use in trailer box constructions. The trailer box F may be of ordinary construction embodying a housing 25 provided at its outer end with a cover plate 26 having a hinged lid or door 27 for gaining access to the housing. Mounted in the upper end of the housing 25 is the brass G having its ends disposed flush with the ends of the housing.

Provided in the top center of the concaved bearing surface of the brass G is a longitudinal oil slot or recess 28 which terminates short of the ends of the brass. A bore 29 opening at one end of the brass and having a lateral bore 30 opening into the slot 28 permits of oil or other lubricant being delivered to the slot 28. The lower or bottom edges of the brass G are rabbeted along their outer sides as at 31 forming ribs 32 extending throughout the length of the brass. Provided in the concaved side of the brass slightly beyond each end of the slot 28 is a circumferential oil or end groove 33 having their lower ends opening at the bottom faces of the ribs 32. These grooves 33 as shown in Figure 8 are of less depth than the thickness of the ribs 32. Provided in each rib 32 just outwardly beyond the lower ends of the circumferential grooves 33, are inverted V-shaped check notches 34 which open at the bottom face of the ribs and serve to prevent the oil from working or creeping towards the ends of the brass.

Removably fitting in the housing 25 beneath the journal I is an oil container or cellar 35 having vertical side walls 36, an inner end wall 37 and a sloping outer end wall 38 which extends beyond the outer end of the housing 25. It may here be well to note that the outer end of the journal I is flush with the outer end of the housing 25 as shown by dot and dash lines in Figure 6. Telescopically associated with the vertical inner end wall 37 is an oil retaining unit including an inner guide plate 39, an outer dust plate 40, and a felt oil strip 41 secured between the upper edges of the plates 39 and 40 for contacting the journal I. A hub wiper felt 42 may be supported from the outer dust plate 40 and extend transversely across the inner end of the cellar 35 so as to contact the hub of the wheel J. This wiper felt 42 may serve to exclude foreign matter from the journal A wooden block 43 is mounted on the inner guide plate 39, and a spring acts upon the block 43 for normally urging the oil retaining unit up into engagement with the journal. Arranged inward of each side wall 36 of the cellar 35 is a yieldable wiper plate 45 and these wiper plates are normally spring urged toward the journal at their upper portions. Secured along the inner side of each wiper plate slightly below the upper edge of the plate is a felt wiper strip 46 for wiping contact with the journal. The upper edges of the wiper plates 45 extend into the rabbets 31 of the brass G so that the ribs 32 extend inward of the wiper plates with a lapped joint as in Figure 5. As shown in Figure 6, the wiper plates 45 and wiper strips 46 extend beyond the outer ends of the brass and the journal, but terminate short of the outer end of the cellar 35.

Like in the form of crown brass shown in Figures 1 to 4, the end grooves 33 prevent the oil from working out to the ends of the brass G and cause this oil to drain from the lower ends of the grooves and drip on the wiper felts 46. Since the upper ends of the wiper plates 45 lap over the outside of the brass G, the oil is returned to the cellar 35. Oil dripping from the brass will drip on the wipers and since the journal is shorter than the wipers, and the outer ends of the wipers terminate inward of the outer cellar wall 38, the oil will drain back into the cellar.

Thus in both forms of the crown brass, check notches are provided and co-act with circumferential end grooves to prevent loss of lubricant beyond the ends of the brass. Likewise, these oil check notches and circumferential end grooves co-act with the lubricating means below the journal in a manner to provide proper lubrication of the end portions of the brass.

Changes in detail may be made to the forms of the invention herein shown and described without departing from the spirit of the invention or the scope of the following claims.

I claim:

1. A crown brass for journals, having a longitudinal lubricant receiving slot in its concaved side terminating short of the ends of the brass, a circumferential groove spaced beyond each end of the slot and opening at the lower edges of the brass, and check notches in the lower edges of the brass beyond the open lower ends of the circumferential grooves.

2. A driving box journal brass having a longitudinal slot in the top of its bearing surface and terminating short of the ends of the brass, an oil duct forming communication between the slot and an end of the brass, a circumferential groove in the bearing surface beyond each end of said slot and having open ends opening at the bottom surfaces of the brass, and a check notch outwardly of each open end of the grooves, said check notches being formed in the lower edges of the bearing surface and opening at said bottom surfaces.

3. A trailer box journal brass having a longitudinal slot in the top of its bearing surface and terminating short of the ends of the brass, an oil duct forming communication between the slot and an end of the brass, a rabbet along the outer lower edges of the brass forming longitudinal ribs, a circumferential groove in the bearing surface beyond each end of said slot and having their lower ends extending across said ribs, and a V-shaped notch in the ribs outwardly of the lower ends of said grooves.

4. In a journal box, a crown brass having a longitudinal slot terminating short of the ends of the brass, a feed duct communicating with the slot and opening at an end of the brass, a circumferential groove beyond each end of said slot, a check notch beyond the lower end of each groove, and lubricating means in the box embodying distributor means disposed below said grooves and check notches to catch lubricant therefrom for lubricating the end portions of the brass.

5. In a journal box, a crown brass having a longitudinal slot terminating short of the ends of the brass, a feed duct communicating with the slot and opening at an end of the brass, a circumferential groove beyond each end of said slot, a check notch beyond the lower end of each groove, wiper strips below said grooves, and oiling blocks below said notches for lubrication of the end portions of the brass beyond the circumferential grooves.

6. In a journal box, the combination with a driving box having side arms provided on their inner side with supporting ribs, of a crown-brass supported at its side edges on the ribs, a longitudinal oil slot in the top of the brass and terminating short of the ends of the brass, a circumferential oil groove in the brass beyond each end of the slot and opening at said ribs, a check notch in the side edges of the brass beyond each open end of the grooves, a wiper strip below each supporting rib and terminating short of the ends of the brass, and an oiling block beneath the end portions of the ribs in the circumferential plane of said notches and the end portions of the wiper strips for lubricating the end portions of the brass.

7. In a journal box, the combination with a trailer box, of a crown brass in the upper portion of the box having a longitudinal oil slot terminating short of the ends of the brass, a circumferential oil groove beyond each end of the slot, a check notch beyond each end of each groove, a rib along the inner lower edges of the brass and in which said check notches are provided, an oil cellar in the lower portion of the box and projecting beyond the outer end of the brass, wiper plates in the cellar and having their upper edges lapped over said ribs on the brass, wiper strips on said plates, and an oiling block beneath the check notches at the inner end of the brass for lubrication of the inner end of the brass.

JOSEPH P. SAVAGE.